United States Patent
Radomski (10) Patent No.: US 9,855,628 B2
(45) Date of Patent: Jan. 2, 2018

(54) MANUFACTURE OF FILLED AEROFOIL (71) Applicant: ROLLS-ROYCE PLC, London (GB)

(72) Inventor: Steven Aleksy Radomski, Nottingham (GB)

(73) Assignee: ROLLS-ROYCE plc, London (GB)

( * ) Notice: Subject to any disclaimer, the term of this patent is extended or adjusted under 35 U.S.C. 154(b) by 752 days.

(21) Appl. No.: 14/474,944

(22) Filed: Sep. 2, 2014

(65) Prior Publication Data
US 2015/0125308 A1    May 7, 2015

(30) Foreign Application Priority Data

Sep. 20, 2013 (GB) .................................. 1316732.5

(51) Int. Cl.
B23P 15/04    (2006.01)
F01D 5/14    (2006.01)
F01D 5/18    (2006.01)

(52) U.S. Cl.
CPC .............. B23P 15/04 (2013.01); F01D 5/147 (2013.01); F01D 5/18 (2013.01); F05D 2230/232 (2013.01); F05D 2230/60 (2013.01); Y02T 50/672 (2013.01); Y02T 50/673 (2013.01); Y02T 50/676 (2013.01); Y10T 29/49336 (2015.01)

(58) Field of Classification Search
CPC . B23P 15/04; F01D 5/147; F01D 5/18; Y02T 50/676; Y02T 50/672; Y02T 50/673; Y10T 29/49336; F05D 2230/60; F05D 2230/232
See application file for complete search history.

(56) References Cited

U.S. PATENT DOCUMENTS

| 2,326,430 | A | | 8/1943 | Blanchard |
| 5,399,393 | A | * | 3/1995 | Zoller ..................... B29C 39/10 293/128 |
| 8,944,773 | B2 | * | 2/2015 | Weisse ..................... B23P 15/04 416/229 R |
| 2008/0253885 | A1 | | 10/2008 | Foose et al. |
| 2010/0000006 | A1 | | 1/2010 | Butler |
| 2010/0247322 | A1 | | 9/2010 | Bochiechio et al. |
| 2010/0266415 | A1 | | 10/2010 | Viens et al. |
| 2011/0211965 | A1 | | 9/2011 | Deal et al. |
| 2013/0164145 | A1 | | 6/2013 | Papin |
| 2013/0167555 | A1 | | 7/2013 | Schwarz et al. |

(Continued)

OTHER PUBLICATIONS

Search Report issued in United Kingdom Application No. GB1316732.5 dated Mar. 21, 2014.

(Continued)

*Primary Examiner* — John C Hong
(74) *Attorney, Agent, or Firm* — Oliff PLC (57) ABSTRACT

A method of manufacturing a filled aerofoil component (100) for a gas turbine engine (10) comprises using a capping panel (200) to cover a pocket (310) in a pocketed aerofoil body (300). During manufacture, a pre-formed filler insert (400) is provided to support the capping panel (200) in the correct position. This ensures that the outer surface of the capping panel (200) is located as accurately as possible. This means that the capping panel (200) can be made to be as thin as possible, which in turn reduces weight and material wastage. The pre-formed filler insert (400) provides a lightweight core for the finished aerofoil component in use.

17 Claims, 3 Drawing Sheets

(56) References Cited

U.S. PATENT DOCUMENTS

2013/0220542 A1 8/2013 Parkin
2014/0286785 A1* 9/2014 Ganesh ................. B23P 15/02
　　　　　　　　　　　　　　　　　　　　416/233

OTHER PUBLICATIONS

Jun. 2, 2015 Search Report issued in European Patent Application No. 14182891.

* cited by examiner

MANUFACTURE OF FILLED AEROFOIL

CROSS-REFERENCE TO RELATED APPLICATIONS

This application is based upon and claims the benefit of priority from British Patent Application Number 1316732.5 filed 20 Sep. 2013, the entire contents of which are incorporated by reference.

BACKGROUND OF THE INVENTION

1. Field of the Disclosure

The present invention relates to the manufacture of an aerofoil having a filled cavity, in particular the manufacture of an aerofoil component having a filled cavity for use in a gas turbine engine.

2. Description of the Related Art

Aerofoil shaped components are used throughout gas turbine engines. For example, aerofoil shaped stator vanes and rotor blades are used to guide gas through the engine, for example both in the turbine and the compressor, including the fan and associated guide vanes.

Weight reduction is an important consideration in gas turbine engines, particularly, although not exclusively, for gas turbine engines used to power aircraft. Generally, the lower the weight of the component the better the performance of the aircraft to which it is fitted, for example in terms of fuel consumption. To this end, it is known to use hollow aerofoils, e.g. rotor blades and/or stator vanes, in some stages of gas turbine engines. The hollow aerofoils have an internal cavity, which may be filled with a lightweight material.

One method of producing a hollow aerofoil involves forming the structure using a skin. This involves creating an internal cavity using hot creep or super plastic forming processes. Such processes may generate aerofoils with some advantageous properties, such as thin skin thickness and tight dimensional tolerance, but they involve significant material wastage. This material wastage makes these processes expensive, due at least to high material cost for a given size of hollow aerofoil component.

An alternative method for producing hollow aerofoil components involves attaching a plate to an aerofoil structure out of which a pocket has been machined. The plate is placed into the pocket and attached (for example welded or bonded) therein to produce a hollow aerofoil component.

An advantage of producing the hollow aerofoil by using a plate to cover a pocket in an aerofoil structure is that there is less material wastage than using a skin to produce the hollow aerofoil. However, the dimensional, tolerances are not so accurate. This may be because distortion is introduced in the process of attaching the plate to the pocketed aerofoil, which typically involves local heating at the interface between the plate and the pocketed aerofoil. Additionally, tolerance errors may "stack-up" in the process used to produce the pocketed aerofoil, the process used to produce the plate, and the process/feature used to locate the plate into position in the pocket, which typically involve placing the plate onto a supporting ledge inside the pocket.

The lack of dimensional accuracy means that the plate generally has to be manufactured to be thicker than would otherwise be required. For example, the extra thickness may be required in order to ensure that there is enough material to be machined back to produce the desired aerofoil shape after it has been fixed into the pocket. Without the extra thickness, the dimensional variation resulting from tolerance "stack-up" and/or distortion may mean that there is not sufficient material to produce the desired aerofoil shape in some of the aerofoils produced by the method.

However, this extra thickness means both that the component is heavier than it would otherwise need to be, and also that there is more material wastage.

Regardless of how the aerofoil is formed, the internal cavity is often filled, both to support the aerofoil structure and to prevent moisture ingress to the cavity. The filler is conventionally a lightweight, non-expandable material, such as syntactic epoxy.

Conventionally, such fillers are injected into the cavity after it is formed, for example by forming the hollow aerofoil using one of the methods outlined above. This means that only fillers which are injectable can be used to fill the cavity. Furthermore, to ensure the panels do not bulge due to internal pressure, foaming/expandable materials cannot be used. Even with judicious positioning of the filling/injection holes, it is not possible to completely fill the internal cavity using such injection.

Furthermore, injecting a filler material into a cavity necessarily results in a filler with homogeneous properties, whereas some composite or foamed structures, which are not injectable, may be stiffer, have lower density and better damping than such homogeneous fillers. As such, the type and selection of filler materials which can be used is limited, and materials which may have advantageous properties may be precluded from use in such an injection filling process Furthermore, filling the cavity by injecting the filler into injection holes after the hollow aerofoil has been formed means that the cavity must be defined such that the filler material can be pumped in from one end and vent out the other end so as to ensure that the cavity is filled as completely as possible. As such any internal pocket definition of the aerofoil, such as stiffening ribs, is compromised because of the need to ensure that such features do not obstruct the flow of the filler, which may result in an unacceptable level of fill.

OBJECTS AND SUMMARY

It is therefore desirable to manufacture hollow aerofoil components by using a plate to cover a pocket (so as to take advantage of the generally lower material wastage), but with improved dimensional tolerance, better structural properties and improved cavity filling.

According to an aspect, there is provided a method of manufacturing an aerofoil having a filled cavity comprising:

providing a pocketed aerofoil body having an open pocket formed in a surrounding hollowed surface;

inserting a pre-formed filler insert into the open pocket;

locating a capping panel over the open pocket in a capping position, the capping panel having an inner surface (which faces into the pocket when in the capping position) and an opposing outer surface;

supporting the inner surface of the capping panel on the filler insert with the capping panel in the capping position; and forming a permanent joint between the capping panel and the pocketed aerofoil body so as to fix the capping panel in position relative to the pocketed aerofoil body, thereby producing the aerofoil having a filled cavity.

When the capping panel is in the capping position, its outer surface may be in a position relative to the pocketed aerofoil body that forms at least a part of gas washed surface of the finished aerofoil in use. Indeed, both the outer surface of the capping panel and the surrounding hollowed surface of the pocketed aerofoil body may form gas washed surfaces of the finished aerofoil in use.

Using a pre-formed filler insert to provide support to the capping panel may result in tighter dimensional tolerance, for example by providing support to the capping panel during the step of forming a permanent joint with the pocketed aerofoil body. Use of a pre-formed filler insert may also avoid the need to compromise the design of the internal structure/cavities of the aerofoil. This may result in an improved structure, which may be stronger and/or lighter than conventional filled aerofoil structures. Any desired material may be used for the pre-formed filler insert, as it does not need to be injectable. This means that materials with improved properties, for example in terms of weight, density, and vibration damping, may be used. For example, anisotropic materials may be used and/or the properties and/or type of the material of the pre-formed filler insert may vary through the insert. The pre-formed filler insert may form the material that fills the cavity of the finished aerofoil.

Any suitable process may be used to form the permanent joint between the capping panel and the pocketed aerofoil body, such as, for example welding.

Any type of welding may be used as desired. For example, the welding may comprise using an energy beam, such as laser welding or electron beam welding. Laser welding may be particularly suitable due to the relatively small heat affected zone (HAZ).

The pre-formed filler insert may be a foaming pre-formed filler insert. The foaming pre-formed filler insert may be activated so as to exert pressure on the inner surface of the capping panel. For example, the pre-formed filler insert may be activated after the step of locating the capping panel in the capping position but before the step of forming a permanent joint between the capping panel and the pocketed aerofoil body. After activation, the pre-formed filler insert may therefore comprise foam. Where the term foam or foaming is used herein, this should be taken to include both closed-cell and open-cell structures. Thus, the term foam as used herein includes both foam and sponge structures.

Where a pre-formed filler insert is a foaming pre-formed filler insert that requires activation, the activation may be performed at any desired time and/or in any suitable manner. For example, activation may be by way of chemical activation, for example by providing a suitable activating agent to the filler insert. Where such chemical activation is used, the activating agent may be provided at any suitable time. For example, the activating agent may be provided prior to inserting the filler insert into the open pocket of the pocketed aerofoil body. In that case, the activating agent may take a predetermined time to cause the insert to foam or expand at least to its final shape. Thus, there may be a delay between activating the pre-formed filler insert and the pre-formed filler expanding, for example to its final size and/or shape. In general, regardless of how the pre-formed filler insert is activated, it may be activated before being inserted into the open pocket of the aerofoil body or after being inserted into the open pocket.

Where an open-cell foaming pre-formed filler insert is used, a secondary filler may optionally be provided (for example by injection) after activation of the foam. Such a secondary filler may at least partially fill the at least some of the open-cells.

The method may comprise engaging a shaped tool with the outer surface of the capping panel in the capping position. If a foaming pre-formed filler insert is used, then when it is activated the capping panel may then be pressed in the direction of the shaped tool. The capping panel may be said to be urged or pushed into the shaped tool. The surface of the shaped tool that engages with the capping panel may have the desired shape of the outer surface of the capping panel, which may be the shape of at least a part of a suction or pressure surface of an aerofoil.

When the capping panel is located in the capping position, there may be a gap between the pre-formed filler insert and the capping panel.

In such an arrangement, the pre-formed filler insert may not be in contact with the inner surface of the capping panel when the capping panel is placed in the capping position, and may become in contact once it is activated. Alternatively, and as described herein, the pre-formed filler may be in contact with the inner surface of the capping panel as soon as the capping panel is inserted into the capping position.

Where a foaming pre-formed filler insert is used, it may comprise a foaming material that is covered at least in part by a barrier material. The barrier material (which may, for example, be a barrier tape) may contain, or surround, the foaming material during activation. The barrier material may, for example, comprise a metal (such as aluminium, which may be provided in the form of a foil) and/or a polymer (such as PTFE). The barrier material may be constructed and arranged to prevent the material of the insert (for example the foam and/or any adhesive) entering the region at which the capping panel and pocketed aerofoil body are subsequently joined (for example by welding) during foaming. Thus, the barrier material may prevent contamination of the joint/weld with the material of the filler insert (which, as described elsewhere herein, may comprise an adhesive layer).

A foaming pre-formed filler insert may comprise, for example, epoxy and/or any resin based material. A foaming pre-formed filler insert may, for example, comprise a syntactic material (for example it may be referred to as a syntactic filler). Such a syntactic filler may comprise lightweight, hollow microspheres.

The pre-formed filler insert may have a thickness such that the step of locating the capping panel in the capping position directly results in the capping panel being supported by the pre-formed filler insert. In such an arrangement, the pre-formed filler insert may or may not be a foaming insert. Again, any suitable material may be used for the insert, including homogeneous, non-homogeneous and composite materials.

Where a non-foaming pre-formed filler insert is used, it may comprise, for example, a pre-cured resin based filler and/or a syntactic filler. The pre-formed filler insert may comprise reticulated vitreous carbon sponge, for example. The pre-formed filler insert may comprise a sandwich construction, such as a rigid/viscoelastic sandwich construction. Such a structure may act as a constrained layer damper, for example during manufacture and/or during use of the final aerofoil component.

The pre-formed filler insert, regardless of whether it is foaming or non-foaming, may be manufactured in any suitable manner, for example by casting, injection moulding, or machining.

The pocketed aerofoil body may comprise a step formed in the hollowed surface that extends around at least a part of the pocket. For example, the step may extend around the entire perimeter (so as to form a socket, for example), or a part of the perimeter, of the pocket. When the capping panel is located in the capping position, at least a part of its inner surface may rest on the step. The step may thus assist in locating the capping panel, which may be particularly beneficial where the insert and capping panel are not in contact prior to foaming of the insert.

The pre-formed filler insert may be provided with an adhesive layer over at least a part of its surface. The adhesive layer may be, for example, an adhesive film. The adhesive layer may be arranged to bond the insert to the pocketed aerofoil body and/or to the capping panel. The adhesive layer may bond the insert to the pocketed aerofoil body and/or to the capping panel prior to the step of forming a permanent joint between the capping panel and the pocketed aerofoil body. Any suitable adhesive may be used, for example an epoxy or polyurethane based adhesive.

The method of manufacturing an aerofoil may further comprise curing the pre-formed filer insert. The curing step may result in the pre-formed filler insert being bonded to the capping panel and/or the pocketed aerofoil body. Such a curing step may be performed prior to the step of forming a permanent joint between the capping panel and the pocketed aerofoil body. Where an adhesive is used, such a curing step may comprise curing the adhesive to form a bond. Any suitable curing process may be used, for example a thermal and/or chemical curing process.

The pre-formed filler insert may comprise a vibration damping material. This may help to ensure that the finished filled aerofoil retains its manufactured shape during use and/or may help to reduce the likelihood of damage and/or failure of the aerofoil component as a result of vibration during use.

The step of forming a permanent joint between the capping panel and the pocketed aerofoil body may comprise forming a permanent joint around substantially the entire interface between the capping panel and the pocketed aerofoil body.

The method may comprise forming (for example machining) the pocket into an aerofoil blank in order to produce the pocketed aerofoil body. Where a step is provided around at least a part of the pocket, the method may also comprise forming (for example machining) the step. The method may comprise forming the aerofoil blank, for example by forging. Alternatively, the pocketed aerofoil body may be formed in any other suitable way, for example comprising a casting process.

According to an aspect of the invention, there is provided an aerofoil manufactured according to the method described above and elsewhere herein. Such an aerofoil may be an aerofoil for a gas turbine engine. Such an aerofoil may be (or may form a part of), for example, a rotating blade or a stationary vane. Such an aerofoil may be a part of a compressor or a turbine.

Purely by way of example, such an aerofoil may be an outlet guide vane of a turbofan gas turbine engine.

According to an aspect of the invention, there is provided a gas turbine engine comprising an aerofoil (or aerofoil component) manufactured at least in part using a method as described above and elsewhere herein in relation to the present invention.

BRIEF DESCRIPTION OF THE DRAWINGS

Embodiments of the invention will now be described by way of example only, with reference to the accompanying diagrammatic drawings, in which.

DETAILED DESCRIPTION OF EMBODIMENTS

Figure 1:
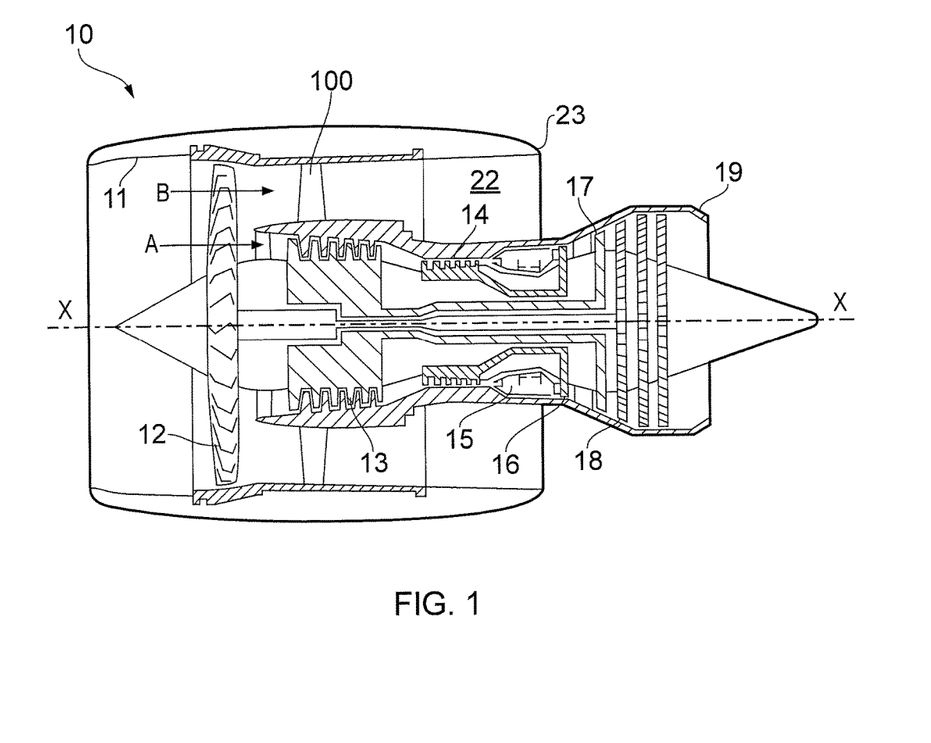
FIG. 1 is a schematic sectional side view of a gas turbine engine.

With reference to FIG. 1, a ducted fan gas turbine engine generally indicated at 10 has a principal and rotational axis X-X. The direction X-X may be referred to as the axial direction of the engine. The engine 10 comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle generally surrounds the engine 10 and defines the intake 11, a bypass duct 22 and a bypass exhaust nozzle 23.

The gas turbine engine 10 works in a conventional manner so that air entering the intake 11 is accelerated by the fan 12 to produce two air flows: a first air flow A into the intermediate pressure compressor 13 and a second air flow B (which may be referred to as a bypass flow B) which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines 16, 17, 18 respectively drive the high and intermediate pressure compressors 14, 13 and the fan 12 by suitable interconnecting shafts.

As the air passes through the gas turbine engine 10 it is heated to high temperatures. In particular, the first airflow A reaches high temperatures as it passes through the core of the engine. Typically, particularly high temperatures may be reached at the exit of the combustion equipment 15, and as the air subsequently passes through the high, intermediate and low-pressure turbines 16, 17, 18.

The gas turbine engine 10 comprises outlet guide vanes (OGVs) 100 extending across the bypass duct 22, which therefore sit in the bypass flow B. Each OGV 100 takes the form of a large stator vane, and thus may be referred to as an aerofoil or aerofoil component 100. A plurality of OGVs 100 is typically provided as an annular array in the bypass duct 22. Because each OGV 100 is an especially large aerofoil component, it is particularly advantageous to reduce its weight. Thus, the OGV 100 in the gas turbine engine 10 is not a solid, homogeneous structure, but instead has a hollow cavity filled with a lighter weight material.

Figure 2:
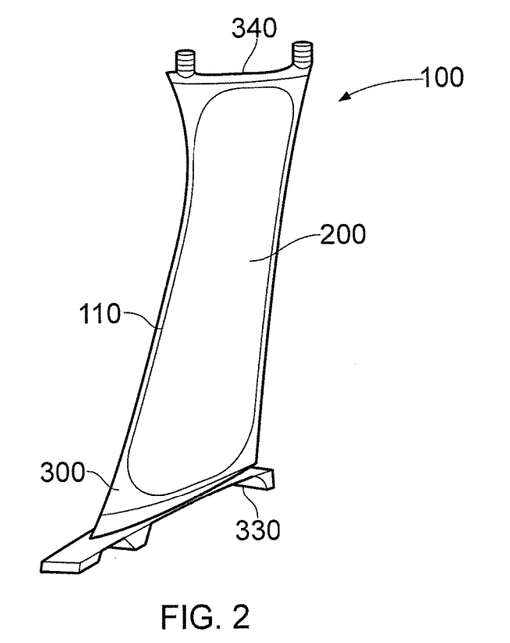
FIG. 2 is a schematic perspective view showing an aerofoil having a filled cavity in accordance with the invention.

FIG. 2 is a schematic of an aerofoil having a filled cavity (which may be referred to herein as a filled aerofoil) in accordance with the invention. In the FIG. 2 example, the filled aerofoil is a filled outlet guide vane (OGV) 100. The filled OGV 100 is manufactured by joining a capping panel 200 to a pocketed aerofoil body 300. The capping panel 200 and the pocketed aerofoil body 300 may be any suitable material, for example metallic and/or composite, and may be the same or different materials.

In FIG. 2, the interface between the pocketed aerofoil body 300 and the capping panel 200 is indicated by the line 110. However, it will be appreciated that after manufacture of the filled aerofoil 100, the join between the original capping panel 200 and the pocketed aerofoil body 300 will be seamless, and may not be visible. As such, the line 110 in FIG. 1 is shown merely for the purpose of indicating the original interface between the capping panel 200 and the pocketed aerofoil body 300 prior to the joining and optional finishing of the filled aerofoil 100. Furthermore, it will be appreciated that the extent of the capping panel 200 is not limited to that illustrated by the line 110 in FIG. 2, which is merely illustrative.

In the example shown in FIG. 2, the filled OGV 100 comprises an inner attachment 330 (which may be a platform) and an outer attachment 340, which may be used to attach the finished OGV 100 to the rest of the gas turbine engine. Such inner and outer attachments 330, 340 may be a part of the pocketed aerofoil body 300. However, it will be appreciated that some pocketed aerofoil bodies 300 may not include one or both of the inner attachment 330 and outer attachment 340. For example, the inner and/or outer attachments 330/340 may be separate features that may be attached to the filled aerofoil 100 after the capping panel 200 and the pocketed aerofoil body 300 have been joined together.

Figure 3:
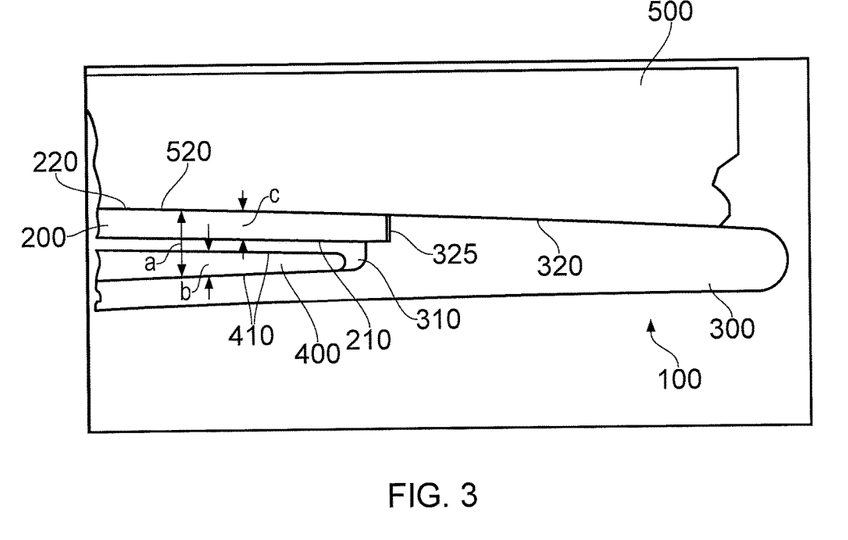
FIG. 3 is a schematic cross-section through a capping panel, pocketed aerofoil body and pre-formed filler insert during manufacture of an aerofoil.

FIG. 3 shows a close-up cross sectional view of the capping panel 200, the pocketed aerofoil body 300, and a pre-formed filler insert 400 during manufacture of the filled OGV 100. It will be appreciated that FIG. 3 shows only a part of the capping panel 200, pocketed aerofoil body 300, and pre-formed filler insert 400 (which may be referred to herein as an insert 400), and that the full parts extend in the chordwise direction, to the left in FIG. 3.'

Figure 4:
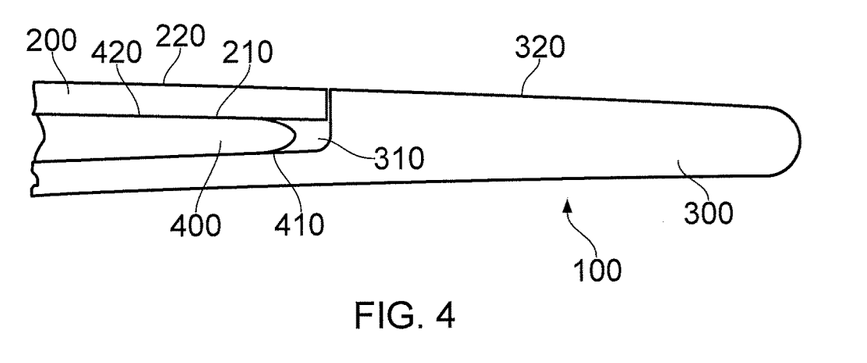
FIG. 4 is a schematic cross-section showing a pocketed aerofoil body and pre-formed filler insert supporting a capping panel during manufacture of an aerofoil.

As shown in FIG. 3, the pocketed aerofoil body 300 comprises a pocket 310 which, prior to being covered by the capping panel 200, is an open pocket 310. The pocket 310 is formed in, and surrounded by, a surrounding hollowed surface 320. In all examples, the surrounding hollowed surface 320 may have a step (which may be a recess, or pocket) 325 formed therein (for example around at least a part of the perimeter of the pocket 310), as in the FIG. 3 example. The step 325 may support the capping panel 200 during manufacture, again as shown in the FIG. 3 example. The step may or may not support the capping panel 200 in the capping position, because the capping position may be defined by the insert 400, optionally in combination with a tool 500. However, other examples, which may otherwise be substantially as shown in FIG. 3, may not have such a step 325. Where no step 325 is provided, the capping panel 200 may be supported in any other suitable manner, for example using a different physical support, or by providing a low pressure (such as a vacuum or pseudo-vacuum) over the outer surface of the capping panel 200. In other arrangements, such as illustrated in FIG. 4 below, the capping panel 200 may be supported directly by the insert 400.

During manufacture, the insert 400 is inserted (or positioned) in the cavity 310. The insert 400 may also be referred to as a core 400. In the FIG. 3 example, there is a gap between the insert 400 and an inner surface 210 of the capping panel 200. In other words, in the FIG. 3 example, the insert 400 does not engage with, or support, the capping panel 200 when the components are initially put into position. This means that, in the FIG. 3 example, the depth a of the pocket 310 is greater than the combined thickness (b+c) of the capping panel 200 and the insert 400 when they are initially put into position for manufacture.

The insert 400 may be an expandable insert 400, which may be referred to as a foaming insert 400. Such a foaming insert 400 may comprise and/or be formed as described elsewhere herein. Such a foaming insert 400 may be activated under given conditions, for example under given conditions of temperature and/or pressure and/or by providing an activation agent, such as a chemical activation agent, as prescribed for the particular material.

In the FIG. 3 example, once activated the foaming insert 400 comes into contact with the capping panel 200, in particular with the inner surface 210 of the capping panel 200. The foaming insert 400 may then substantially fill the cavity 310 (not shown in the figures). Under activation, the foaming insert 400 may exert a force on the capping panel 200 as it tries to expand further. The capping panel 200 may be constrained from moving away from the cavity 310, for example by appropriate tooling 500.

The tooling 500 may have an engagement surface 520 that has the shape of the desired aerofoil profile over a portion at which it engages at least with an outer surface 220 of the capping panel 200. As such, if the capping panel is provided with a force away from the cavity 320, for example under the action of a foaming insert 400, it is pressed into the engaging surface 520 of the tooling 500. This may help to form an accurate aerodynamic profile over this region. This results in an accurate gas-washed profile of the finished aerofoil.

Activation (or curing) of the foaming insert 400 may result in it being bonded to the capping panel 200, and it may therefore act to hold the capping panel 200 to the pocketed aerofoil body 300 in the desired relative position. As described in more detail elsewhere herein, the capping panel 200 and the pocketed aerofoil body 300 may then be permanently bonded or joined together, for example by welding.

The foaming insert 400 may have a barrier layer 410 formed around its periphery, as in the FIG. 3 example. The barrier layer 410 may be in the form of a tape, for example. The barrier layer 410 may be, for example, a polymer and/or a metallic barrier layer 410. Such a barrier layer 410 may be arranged to prevent any material from the insert 400 (or any associated adhesive) entering and/or contaminating the joint or bond (for example weld) between the capping panel 200 and the pocketed aerofoil body 300. Such a barrier layer may, of course, be provided to any insert 400 according to the invention.

FIG. 4 shows a filled capping panel 200 during manufacture using an alternative process. In the arrangements shown in FIGS. 3 and 4, like features are provided with like reference numerals. In FIG. 4, the insert 400 engages with, and thus supports, the inner surface 210 of the capping panel 200 throughout manufacture. The insert 400 shown in FIG. 4 may be a precision engineered insert 400 to ensure that the capping panel 200, and particularly the outer surface 220 of the capping panel 200, is located accurately in the desired position when located on the insert 400. In contrast to the FIG. 3 arrangement, no step 325 in the pocketed aerofoil body 300 is required in order to provide initial support to the capping panel 200, which is instead positioned and supported on the insert 400 throughout.

Any suitable material may be used for the insert 400 shown in FIG. 4, such as a composite or a homogeneous material. Typically, the insert 400 would not be a foaming insert such as that shown in FIG. 3, but would instead retain its size and shape throughout manufacture. However, the insert 400 of the FIG. 4 arrangement may be a foaming insert, in which case a tool such as the tool 500 shown in FIG. 3, may be provided to constrain the capping panel 200 when the insert 400 is activated.

The insert 400 may be substantially incompressible throughout the joining process. For example, the insert 400 may be substantially incompressible even when subjected to elevated pressure and/or temperature which may be used to activate an adhesive that may be used to bond the capping panel 200 to the insert 400. As an alternative to being substantially incompressible, the insert 400 may experience a degree of compression, expansion, or deformation during the manufacture of the filled aerofoil 100, but in that case the compression/expansion/deformation would be specifically designed to ensure that the capping panel 200 is retained in the desired position during subsequent joining (for example welding, as described elsewhere herein).

Once the capping panel 200 has been positioned on the insert 400, it may be held in position, for example using an adhesive, such as a film adhesive 420. As with the FIG. 3 example, a barrier material 410 may be provided to surround the insert 400.

Figure 5:
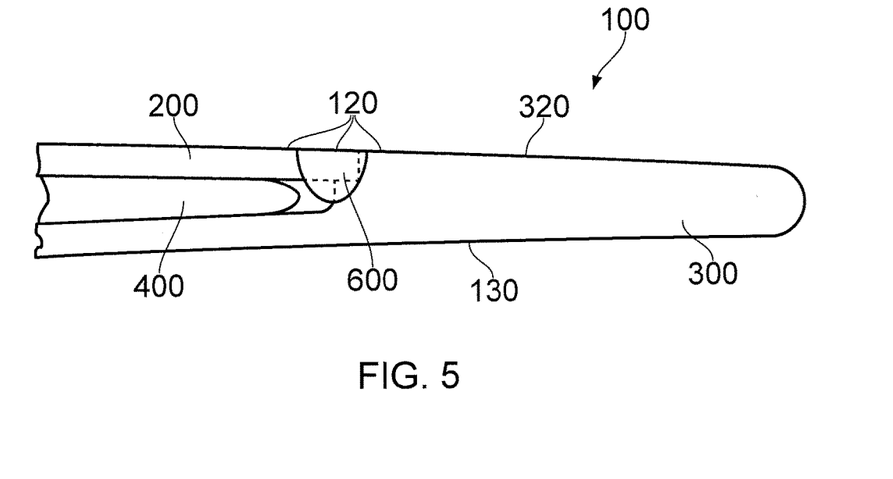
FIG. 5 is a schematic cross-section showing an aerofoil having a capping panel joined to a pocketed aerofoil body, with a pre-formed filler insert inside the aerofoil.

FIG. 5 shows a section through a part of a completed filled aerofoil 100. The filled aerofoil 100 shown in FIG. 5 may be manufactured according to the invention, such as by the methods and apparatus shown and described in relation to either FIG. 3 or FIG. 4.

FIG. 5 shows a permanent bond or joint in the form of a weld 600 between the capping panel 200 and the pocketed aerofoil body 300. The weld 600 may be formed by any suitable welding process. For example, the weld 600 may be a laser weld 600. The weld 600 may, for example, extend around the interface between the capping panel 200 and the pocketed aerofoil body 300, such as that illustrated by way of example in FIG. 2 by the line 110.

Because the capping panel is supported by the insert 400 in the interim state prior to welding, it may not be necessary to clamp the capping panel 200 during welding. This may be particularly advantageous where no step 325 is provided in the pocketed aerofoil body 300, such as in the example shown in FIG. 4.

Typically, immediately after a weld is formed, the area around the weld tends to shrink as it cools. This can cause problems with distortion of the geometry. However, because the capping panel 200 is supported over a significant portion of the area of its inner surface 210 (for example substantially all of its area) according to the invention, the conventional problems associated with post-weld distortion can be avoided, or at least reduced. Instead of distorting, the capping panel 200 used in the present invention would tend to adopt a (desired) shape corresponding to the underlying insert 400. In turn, this may allow a thinner capping panel 200 than would conventionally be required to be used, because a reduced tolerance for post-weld machining may be used.

As such, the shape of the capping panel 200 may be defined at least in part by the insert 400 on which it is supported during welding. As such, the insert 400 may at least in part define the shape of the capping panel 200, for example the shape of the inner surface 210 and/or the outer surface 220 of the capping panel 200.

In the examples described herein, the capping panel 200 forms a part of the suction surface 120 of the finished filled aero foil 100. However, it will be appreciated that the capping panel could form a part of the pressure surface 130. The capping panel 200, the weld 600, and the surrounding hollowed surface 320 of the pocketed aerofoil body 300 may all form part of the suction surface 120 (as shown in the FIG. 5 example) or the pressure surface. A finishing process, such as machining or linishing, may be used after forming the permanent joint between the capping panel 200 and the pocketed aerofoil body, for example to avoid any unwanted material remaining after the joining step.

It will be appreciated that it could be applied to any aerofoil or aerofoil component, such as any rotor blade or stator vane, for example for use in a turbine, compressor, or other aerofoil-shaped component of a gas turbine engine. Purely by way of example, the aerofoil 100 may be a filled OGV 100 such as that shown by way of example in FIGS. 1 and 2.

It will be appreciated that many designs and/or arrangements of features, such as capping panel 200, pocketed aerofoil body 300 or insert 400, other than those shown in and described in relation to FIGS. 1 to 5 and not explicitly described herein fall within the scope of the invention. Furthermore, any feature described and/or claimed herein may be combined with any other compatible feature described in relation to the same or another embodiment.

I claim:

1. A method of manufacturing an aerofoil having a filled cavity, the method comprising:
   providing a pocketed aerofoil body having an open pocket formed in a surrounding hollowed surface;
   inserting a pre-formed filler insert into the open pocket, the pre-formed filler insert being surrounded by a barrier layer;
   locating a capping panel over the open pocket, the capping panel having an inner surface and an opposing outer surface;
   supporting the inner surface of the capping panel on the filler insert such that the capping panel is in a capping position, wherein in the step of supporting the inner surface of the capping panel, the capping panel is not directly supported by the pocketed aerofoil body; and
   forming a permanent joint between the capping panel and the pocketed aerofoil body so as to fix the capping panel in position relative to the pocketed aerofoil body, thereby producing the aerofoil having a filled cavity.

2. A method of manufacturing an aerofoil having a filled cavity according to claim 1, wherein the step of forming a permanent joint between the capping panel and the pocketed aerofoil body comprises welding.

3. A method of manufacturing an aerofoil having a filled cavity according to claim 2, wherein the welding comprises laser welding.

4. A method of manufacturing an aerofoil according to claim 1, wherein when the pre-formed filler insert has a thickness such that the step of locating the capping panel over the open pocket directly results in the capping panel being supported by the pre-formed filler insert in the capping position.

5. A method of manufacturing an aerofoil according to claim 1, wherein:
   the pocketed aerofoil body comprises a step formed in the hollowed surface that extends around at least a part of the pocket; and
   when the capping panel is located over the open pocket, a part of its inner surface rests on the step.

6. A method of manufacturing an aerofoil according to claim 1, wherein:
   the pre-formed filler insert is provided with an adhesive layer over at least a part of its surface, the adhesive layer being arranged to bond the insert to the pocketed aerofoil body and/or to the capping panel.

7. A method of manufacturing an aerofoil according to claim 1, further comprising curing the pre-formed filler insert.

8. A method of manufacturing an aerofoil according to claim 1, wherein the pre-formed filler insert comprises a vibration damping material.

9. A method of manufacturing an aerofoil according to claim 1, wherein the step of forming a permanent joint between the capping panel and the pocketed aerofoil body comprises forming a permanent joint around substantially the entire interface between the capping panel and the pocketed aerofoil body.

10. A method of manufacturing an aerofoil according to claim 1, further comprising forming the pocket into an aerofoil blank in order to produce the pocketed aerofoil body.

11. A method of manufacturing an aerofoil having a filled cavity, the method comprising:
providing a pocketed aerofoil body having an open pocket formed in a surrounding hollowed surface;
inserting a pre-formed filler insert into the open pocket;
locating a capping panel over the open pocket, the capping panel having an inner surface and an opposing outer surface;
supporting the inner surface of the capping panel on the filler insert such that the capping panel is in a capping position; and
forming a permanent joint between the capping panel and the pocketed aerofoil body so as to fix the capping panel in position relative to the pocketed aerofoil body, thereby producing the aerofoil having a filled cavity, wherein the pre-formed filler insert is a foaming pre-formed filler insert.

12. A method of manufacturing an aerofoil according to claim 11, further comprising activating the foaming pre-formed filler insert so as to exert pressure on the inner surface of the capping panel.

13. A method of manufacturing an aerofoil according to claim 11, wherein the foaming pre-formed filler insert is activated after the step of locating the capping panel over the open pocket, but before the step of forming a permanent joint between the capping panel and the pocketed aerofoil body.

14. A method of manufacturing an aerofoil according to claim 11 further comprising:
engaging a shaped tool with the outer surface of the capping panel in the capping position, such that when the foaming pre-formed filler insert is activated, the capping panel is pressed in the direction of the shaped tool.

15. A method of manufacturing an aerofoil according to claim 11, wherein:
when the capping panel is located in position over the open pocket, there is a gap between the pre-formed filler insert and the capping panel.

16. A method of manufacturing an aerofoil according to claim 11, wherein:
the foaming pre-formed filler insert comprises a foaming material that is covered at least in part by a barrier material that surrounds the foaming material during activation.

17. A method of manufacturing an aerofoil according to claim 11, wherein:
the foaming pre-formed filler insert comprises epoxy and/or a resin based material and/or a syntactic material.

* * * * *